(12) United States Patent
Berger et al.

(10) Patent No.: US 12,313,193 B2
(45) Date of Patent: May 27, 2025

(54) SCREW PART HAVING ANNULAR CROSS-SECTION

(71) Applicant: VOSS AUTOMOTIVE GMBH, Wipperfürth (DE)

(72) Inventors: Markus Berger, Wipperfürth (DE); Harald Hagen, Wipperfürth (DE); Daniel De Beer, Engelskirchen (DE); Günter Sieper, Remscheid (DE); Reiner Mitterer, Wipperfürth (DE); Peter Diederichs, Marienheide (DE); Martin Johnen, Wipperfürth (DE); Evelin Rosowski, Wipperfürth (DE)

(73) Assignee: VOSS Automotive GmbH, Wipperfürth (DE)

( * ) Notice: Subject to any disclaimer, the term of this patent is extended or adjusted under 35 U.S.C. 154(b) by 90 days.

(21) Appl. No.: 18/268,509

(22) PCT Filed: Dec. 21, 2021

(86) PCT No.: PCT/EP2021/087048
§ 371 (c)(1),
(2) Date: Jun. 20, 2023

(87) PCT Pub. No.: WO2022/136406
PCT Pub. Date: Jun. 30, 2022

(65) Prior Publication Data
US 2024/0035596 A1    Feb. 1, 2024

(30) Foreign Application Priority Data
Dec. 21, 2020   (DE) .................... 10 2020 134 501.1

(51) Int. Cl.
*F16L 19/025*   (2006.01)
*B29C 45/14*    (2006.01)
(Continued)

(52) U.S. Cl.
CPC ...... *F16L 19/025* (2013.01); *B29C 45/14311* (2013.01); *B29C 45/2618* (2013.01);
(Continued)

(58) Field of Classification Search
CPC . F16L 47/00; F16L 47/04; F16L 47/16; F16L 47/20; F16L 47/24; F16L 25/02; F16L 25/023; F16L 19/00; F16B 33/006
(Continued)

(56) References Cited

U.S. PATENT DOCUMENTS

| 5,406,983 A * | 4/1995 | Chambers ................. F16L 9/14 138/143 |
| 2014/0157568 A1 | 6/2014 | Hennemann |

FOREIGN PATENT DOCUMENTS

| DE | 10 2006 051 774 A1 | 5/2008 |
| WO | 2013/092234 A1 | 6/2013 |
| WO | 2015/158805 A1 | 10/2015 |

* cited by examiner

*Primary Examiner* — Aaron M Dunwoody
(74) *Attorney, Agent, or Firm* — Honigman LLP; Eric J. Sosenko; Jonathan P. O'Brien

(57) ABSTRACT

A screw part with an annular cross-section and having a base element that is hollow, cylindrical and at least partially injection-molded from a plasticized polymeric mass containing fibers. The base element includes at least one internal and/or external thread and an inner channel for arranging and/or passing through a conduit system element. The inner channel has at least one sealing section for sealing with the conduit system element and/or at least one support section for supporting and/or guiding the conduit system element and/or at least one retaining section for directly or indirectly locking the conduit system element. An insertion sleeve is arranged in the base element coaxially with the inner channel. The insertion sleeve is at least partially encapsulated by the polymeric mass with the polymeric mass facing radially (Continued)

towards the inner channel and radially away from the inner channel. A process for manufacturing such a screw part.

33 Claims, 7 Drawing Sheets

(51) Int. Cl.
    *B29C 45/26*     (2006.01)
    *B29C 45/27*     (2006.01)
    *F16L 19/02*     (2006.01)
    *B29K 705/12*     (2006.01)
    *B29L 1/00*     (2006.01)

(52) U.S. Cl.
    CPC ...... *B29C 45/2708* (2013.01); *F16L 19/0218* (2013.01); *B29C 2045/14327* (2013.01); *B29K 2705/12* (2013.01); *B29L 2001/007* (2013.01)

(58) Field of Classification Search
    USPC .................................................. 411/902, 903
    See application file for complete search history.

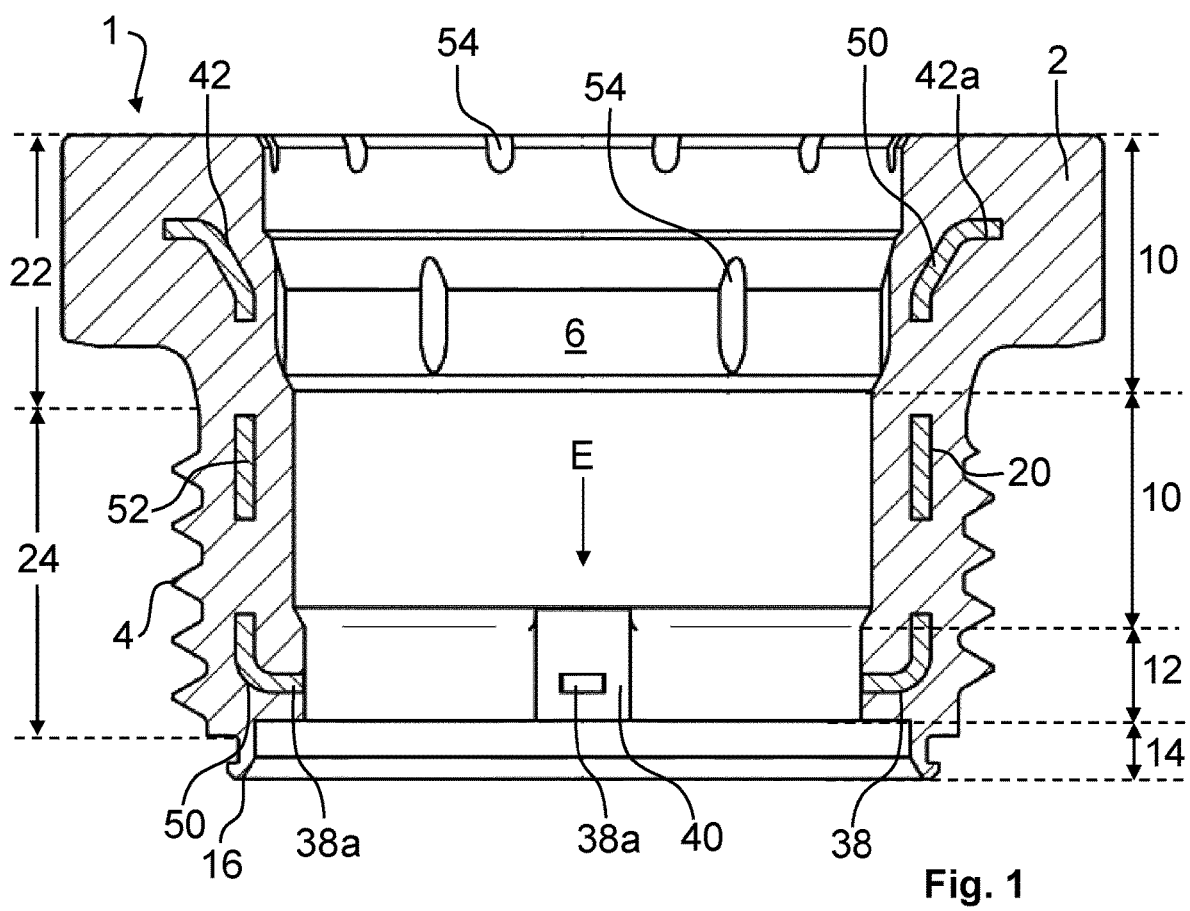
Fig. 1
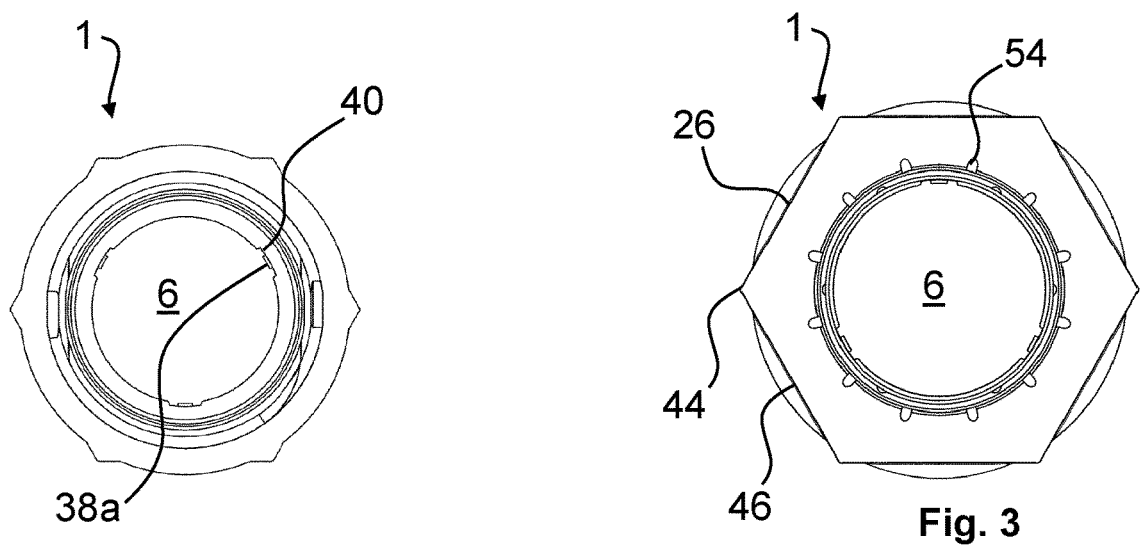
Fig. 2
Fig. 3

SCREW PART HAVING ANNULAR CROSS-SECTION

BACKGROUND

The invention relates to a screw part with an annular cross-section, in particular a banjo bolt or a nut. The screw part has a hollow cylindrical base element injection molded at least partially from a plasticized polymeric mass containing fibers. The base element has at least one internal thread and/or one external thread and an inner channel for arranging and/or passing through a conduit system element in an insertion direction. The inner channel has formed at least one sealing section for arranging a circumferential seal for sealing between the inner channel and the conduit system element and/or at least one support section for supporting and/or guiding the conduit system element and/or at least one retaining section for directly or indirectly locking the conduit system element.

Furthermore, the invention relates to a process for manufacturing such a screw part.

Such screw parts adapt a standardized threaded bore, in particular ISO 4039-2 or ISO 6149, to a contour into which a conduit system element, in particular a plug part of a connector, is inserted. Alternatively, such screw parts are also used for thread reduction.

WO 2013/092234 A1 discloses a generic screw part and a process for its manufacture. Here, the inner channel is subdivided into various axially aligned functional sections for the application of a circumferential seal, for direct or indirect holding and/or locking of a conduit system element designed as a plug part and/or for supporting and/or guiding the plug part. By means of a specific manufacturing process, WO 2013/092234 A1 enables the screw part to be manufactured with increased strength, in particular with increased axial tensile strength. In this respect, it is envisaged that during manufacture the sprue is made facing the inner channel and in a section of the inner channel that does not serve to apply a peripheral seal or to hold and/or lock the plug part that can be inserted into the screw part. In particular, a locally different shrinkage behavior during solidification of the polymeric mass leads to deformations, which in particular make assembly more difficult, and/or to an uneven stress curve under loads.

In order to achieve improved stress behavior, WO 2015/158805 A1 discloses a generic screw part, in which a recess is created in a region of the thread which—separated by the wall of the base element—is opposite the region of the injection point, which optimizes the distribution of the polymeric mass, in particular in the threaded regions of the screw part.

Even though WO 2015/158805 A1 discloses a screw part which, compared to the screw part known from WO 2013/092234 A1, has a lower extent of deformation and better stress behavior under a load, there is a high loss of material in both the screw part from WO 2015/158805 A1 and the screw part according to WO 2013/092234 A1, since both processes provide for a high number of sprues. Furthermore, despite the improved shrinkage behavior, the screw part of WO 2015/158805 A1 tends to exhibit out-of-round deformation, so that the screw part also continues to have a relatively large manufacturing tolerance.

Furthermore, the screw parts known from the prior art regularly have grooves of reduced diameter, for example for the arrangement of sealing elements. This groove creates a weakening point, in particular between a actuating contour and a threaded section. When the screw part is screwed with a torque required for self-retaining and sealing, the screw part cannot generate sufficient resistance to the torque due to the weakening point and can break off, in particular in the area of the weakening point. Since the size of a thread of a mating element corresponding to the screw part is regularly predetermined, an increase in cross-section in the area of the weakening point is also usually not possible. Furthermore, after the connection has been tightened with sufficient tightening torque, relaxation of the plastic material can cause unwanted loosening of the connection.

SUMMARY

The invention is based on the task of providing a screw part which avoids the disadvantages known from the prior art and, in particular, has a high torque and a low manufacturing tolerance, as well as a process for manufacturing such a screw part.

According to the invention, the task is solved by the features of claim 1 in that an insertion sleeve is arranged in the base element coaxially with the inner channel, which insertion sleeve is at least partially encapsulated by the polymeric mass, so that the insertion sleeve is at least partially surrounded by the polymeric mass radially facing towards the inner channel and radially away from the inner channel.

The features according to the invention make it possible, by means of the overmolded insertion sleeve, to provide a screw part which is inexpensive to manufacture and has optimized properties for meeting the requirements for transmissible torque and roundness.

Furthermore, the screw part according to the invention exhibits reduced creep behavior. Advantageously, the screw part thus exhibits a reduced loss of preload force compared with known injection-molded screw parts, for example, because in a critical cross-section of the screw part, in particular in the region of a groove in the inner channel, the axial preload force is absorbed and retained by the insertion sleeve.

Furthermore, symmetrical fiber alignment can be prevented by means of the insertion sleeve, whereby homogeneous mixing of the fibers and fiber orientation in the component is achieved by means of the structure of the insertion sleeve during injection molding of the base element. As a result, the fiber orientation, advantageously for load cases, is asymmetrical over the entire base element. In particular, this improves the bonding and mechanical properties of the screw part.

Another advantage of the homogeneous, asymmetrically arranged fibers in the base element is that fewer injection points are required to produce the base element as an injection molded part than in the prior art. In the prior art screw parts, several injection points are regularly necessary because the fibers tend to arrange themselves symmetrically in one flow direction when the plasticized mass spreads in a cavity of a molding tool. In the prior art, this effect is prevented by using a plurality of injection points. In particular, the homogeneous asymmetrical arrangement of the fibers produced by the insertion sleeve means that only one injection point is sufficient to completely inject the base element. Advantageously, this saves material which is produced as scrap in the sprue at each injection point. Furthermore, a hot runner system for injection molding is also suitable for manufacturing the screw part according to the invention, which again results in less scrap than conventional unheated injection molding systems.

In particular, the fact that the base element is at least partially injection molded from a plasticized polymeric mass containing fibers means, in the sense of the invention, that the base element is formed only from the polymeric mass and the overmolded insertion sleeve and, in particular, does not have any other foreign bodies, such as a threaded bushing/sleeve. Expediently, the thread(s) is/are formed from the fiber-containing polymeric mass.

In particular, the base element has an axially extending mounting section and an axially extending threaded section. Advantageously, the base element has a force engagement in the mounting section and, in particular, an external thread on an external wall in the threaded section. Advantageously, the insertion sleeve is arranged in the base element at least partially in the mounting section and at least partially in the threaded section. Advantageously, this allows a high torque applied to the force engagement to be transmitted into the threaded section, in particular without tearing off the screw part.

In this sense, it is further advantageous if the insertion sleeve is formed and arranged in the polymeric mass such that the insertion sleeve extends at least over all functional sections of the inner channel, if any. Advantageously, the insertion sleeve extends in particular over at least one sealing section, at least one support section and at least one retaining section.

Advantageously, the insertion sleeve has a circumferentially closed ring profile in a plan view axial to the inner channel. In the screw part, in particular because of the thread, a pressure directed radially towards the insertion sleeve acts during screwing. To prevent radial compression or radial expansion, the advantageous insertion sleeve is particularly suitable because of its expediently closed ring profile.

In a further variant of the invention, the insertion sleeve has openings distributed circumferentially in a circumferential wall. It has proved particularly advantageous if the openings occupy an opening proportion of at least 30% of the circumferential wall. By means of the openings, the insertion sleeve is advantageously overmolded by the plasticized polymeric mass also in the openings. Advantageously, the insertion sleeve is thereby positively arranged in the polymeric mass. In another advantageous aspect, the openings improve the intermixing of the fiber alignment.

In one advantageous embodiment, the openings provide that a wall thickness of the insertion sleeve or the circumferential wall and/or a size of the openings is greater than or equal to a fiber length of the fibers contained in the polymeric mass.

Preferably, the openings are formed as circular holes, the holes expediently having a pitch circle diameter in the range of from 1 mm to 3 mm, preferably in the range of from 1.5 mm to 2.5 mm.

According to one embodiment, the insertion sleeve is formed as a sheet metal part, which in particular has a hollow cylindrical shape. Advantageously, the insertion sleeve can be manufactured as a sheet metal part at low cost and adapted to individual requirements such as diameter, wall thickness and/or opening proportion.

An alternative embodiment of the insertion sleeve provides that the insertion sleeve is designed as a skeleton-like supporting structure with supports and beams. This includes, in particular, mesh-like lattice structures. Preferably, the openings are formed as polygons enclosed by the supports and beams and therefore have in particular an angular shape. Expediently, the insertion sleeve from the skeleton-like supporting structure is also formed as a bending element and bent into the sleeve shape about a central sleeve axis. In particular, the insertion sleeve is arranged with the central sleeve axis coaxial with the inner channel 6 in the manufactured screw part.

Preferably, the insertion sleeve is formed from a bending element bent into a sleeve about the central sleeve axis. Preferably, two outer edges of the bending element bent together engage in each other in a form-fitting manner with a contour for mutual connection. This design can be advantageously implemented both in a design of the insertion sleeve as a sheet metal part and in a design as a skeleton-like supporting structure. In particular, the form-fit connection of the outer edges creates a closed ring profile, whereby the outer edges can be supported on one another so that, in particular, radial indentation and/or radial expansion is prevented.

According to a further variant, as an alternative or supplement to the positive connection of the outer edges by means of a contour, the two bent-together outer edges of the bending element are connected to one another by material bonding, in particular by welding. Unintentional loosening of the outer edges from one another is thus effectively prevented.

According to a further embodiment, the insertion sleeve is designed as a bending element, in particular as a perforated deep-drawn part, so that in particular there is no need to join the outer edges.

In a particular embodiment, the insertion sleeve is tapered in diameter in the direction of insertion. The conical insertion sleeve produces a more uniform wall thickness over the entire longitudinal axis of the base element, in particular on the side of the insertion sleeve facing the inner channel.

In a further variant of the invention, the insertion sleeve has formed at least at one axial end at least two, preferably three or more webs distributed over the circumference of the insertion sleeve and in particular facing the inner channel. Preferably, the total number of webs is so large that an almost closed circle is formed. Expediently, the webs improve the arrangement of the insertion sleeve in the polymeric mass. In particular, the webs or a part of the webs each protrude with an end section from the polymeric mass. The end sections preferably serve to arrange, in particular axially and radially position and clamp the insertion sleeve within the cavity of the molding tool.

The insert sleeve is particularly advantageous for the production of the base element by means of a molding tool which has a multi-part core. If the core parts are arranged next to each other axially to the inner channel of the screw part to be produced when the plasticized polymeric mass is injected into the cavity, the insertion sleeve can be arranged in a positionally secure manner between a first core part with a smallest diameter and a second core part with a larger diameter.

Expediently, it has been found advantageous for the functions of the individual sections of the inner channel if the end sections of the webs in the support section or a non-functional section protrude from the polymeric mass. Expediently, this support section or non-functional section of the inner channel is arranged axially adjacent to the sealing section and/or the retaining section and, in particular, does not serve to apply a circumferential seal or to lock the conduit system element in place.

In particular, in order not to impair the functions of the respective section of the inner channel and advantageously to optimize the complexity of the molding tool, at least one axially extending groove is formed in a circumferential section of the inner channel, in which one of the webs protrudes from a groove base. Preferably, the web has a maximum radial height corresponding to a depth of the groove. In particular, the web thus does not project into the inner channel in such a way that a conduit system element which is to be arranged and/or locked in the inner channel comes into material contact with one or more of the webs.

In addition or as an alternative to the webs facing the inner channel, a particular variant of the invention provides that at least one web is designed to face radially outwardly from the inner channel. It is also expedient that one web is designed to point axially towards the inner channel. Since the webs are angled outwardly and/or project perpendicularly from the sleeve in the insertion direction, the contact surfaces to the molding tool, in particular the sliders and the core part, emerge from the polymeric mass at different points than in the case of the webs described above, which are designed to point toward the inner channel. Expediently, this design is particularly advantageous for vertical injection molding machines. Production with a vertical injection molding machine has the particular advantage over a horizontal injection molding machine that the inserts do not rest on one side of the mandrel due to gravity. With a vertical injection molding machine, it is advantageously easier to mount the insert centrally.

According to the advantageous design of the insertion sleeve, the outwardly facing webs can be supported in the outer sliders and, in particular, axially secured on at least one sloping surface of the sliders facing partially in the insertion direction in the molding tool during injection molding. Furthermore, the axially extending webs permit very precise positioning of the insertion sleeve in the molding tool, in that the webs can preferably rest on the core part of the molding tool. For the purpose of better filling of the base element with the polymeric mass, an improved variant provides that the axially extending webs have a rounded end section.

Particularly advantageous for torque transmission, especially when the screw part is designed as a hollow cylindrical screw, according to a further variant the insertion sleeve has formed in the mounting section at least six, preferably twelve, teeth distributed over the circumference of the insertion sleeve. Here, the teeth preferably extend with an end section outward into the force engagement. In particular, the insertion sleeve forms a toothed collar with the teeth, so that the insertion sleeve is positively surrounded by the polymeric mass by means of the teeth, even against rotation, and protects the screw part over its axial extent, in particular against defects caused by torque application at the force engagement.

For further optimization of the transmissible torque and provision of pull-out protection in the case of large force engagement, the end sections of the teeth can widen towards the force engagement in such a way that, in a plan view axial to the inner channel, the end sections of the teeth are trapezoidal in shape. The trapezoidal design of the end sections is in particular such that the end sections of the teeth facing the inner channel have an undercut. During manufacture of the screw part, the polymeric mass fills the undercuts and counteracts withdrawal of the force engagement from the insertion sleeve in the manufactured screw part.

Expediently, the teeth of the insertion sleeve are adapted to an outer contour of the force engagement. Advantageously, the force engagement has a regular convex polygonal outer contour, e.g. a hexagon for a corresponding tool wrench. In one embodiment, at least one tooth of the insertion sleeve is assigned to a corner point of the polygonal outer contour and preferably extends radially to this assigned corner point. It has been shown to be particularly advantageous that the end sections of the teeth of the insertion sleeve, which are assigned to a corner point, are designed to converge at an angle in the direction of the corner point according to one embodiment. This angle, in which the end sections converge, preferably corresponds to an inner angle, which the two sides of the polygonal outer contour converging in this corner point enclose.

In a variant with the force engagement with a regularly convex polygonal outer contour, according to an embodiment of the invention, at least one tooth, is associated with one side of the polygonal outer contour. The respective tooth expediently extends in the direction of a point on the respective side, this point being arranged on a half distance of the side. It is also advantageous if the end section of the tooth has, in particular, an end face extending parallel to the respective side. A deviating likewise advantageous embodiment with an undetermined orientation and positioning of the insertion sleeve with respect to the outer contour has the advantage that the insertion sleeve does not have to be positioned with respect to the outer contour of the screw part.

The insertion sleeve is preferably made of a metallic material. Aluminum has proved to be particularly advantageous in this respect, since aluminum has a shrinkage similar to a polymeric mass with a fiber content, in particular a glass fiber content, of approximately greater than/equal to 40% by mass. Another advantageous variant of the insertion sleeve is made of a VA steel, e.g. a 1.4301 stainless steel according to DIN EN 10088-2: 2014-12.

Optionally, the insertion sleeve can also be made of an organo-sheet. This is in particular a laminate of fibers, preferably carbon or glass fibers, with plastic, expediently a polyamide.

Expediently for the invention, the fiber-containing plasticized polymeric mass of the base element has a volume fraction of fibers in the range from 2.5% to 75%, in particular 14% to 40%, and/or a mass fraction of fibers from 30% to 75%, preferably 50% to 65%.

Also advantageously for achieving the required properties, the fibers have a length in the range from 0.1 mm to 10 mm. Preferably, the fibers are formed as short fibers with a length in the range from 0.2 mm to 0.5 mm and/or as long fibers with a length in the range from 1 mm to 10 mm. It is also expedient if the fibers have an average diameter in the range from about 3 µm to 35 µm, preferably an average diameter in the range from 5 µm to 20 µm. In particular, in screw parts with an insertion sleeve having the openings, the fiber lengths are preferably smaller than or approximately equal to, in particular at most equal to, the size of the openings, in particular the pitch circle diameter.

A process according to the invention for manufacturing the screw part according to at least one of the aforementioned embodiments of the screw part provides that the screw part is produced by an injection molding process, which provides only one injection point for injecting the polymeric mass. The reduction of the necessary injection points reduces the manufacturing effort. Furthermore, the polymeric mass is homogeneously distributed within the base element. In particular, no joints form in the polymer material of the base element during production. In the prior art, such joints can be caused by the meeting of two polymeric masses injected at different points, with the joints regularly representing a weak point in the screw part produced.

It is also advantageous for production if the injection point is arranged at an angle to the inner channel of the screw part to be produced in such a way that the polymeric mass is injected into a closed molding tool at an angle to the inner channel. The advantage of angled injection is that more free space is available for the core part in the area of the inner channel, which is formed by the core part that can be inserted perpendicularly in the insertion direction. In particular, this design allows the corresponding core part of the molding tool to be actively cooled by means of core cooling. The core cooling advantageously increases the production speed and extends the service life of the molding tool, in particular of the core part.

In particular, the process for manufacturing the screw part uses a hot runner system for injection molding. Particularly preferably, the hot runner system is used in combination with a core part with a core cooling system, so that the manufacturing is further improved.

Further advantageous embodiments of the invention are apparent from the following description of figures and the dependent subclaims.

BRIEF DESCRIPTION OF THE DRAWINGS

FIG. 1 is a longitudinal section through a screw part axially to an inner channel of the screw part, FIG. 2 is a rear view of the screw part according to FIG. 1 against the insertion direction according to FIG. 1, FIG. 3 is a top view of the screw part according to FIG. 1 in an insertion direction according to FIG. 1.

In the various figures of the drawing, the same parts are always given the same reference signs.

DETAILED DESCRIPTION

Regarding the following description, it is claimed that the invention is not limited to the embodiment examples and thereby not limited to all or several features of described feature combinations, rather each individual partial feature of the/each embodiment example is also of significance for the object of the invention detached from all other partial features described in connection therewith for itself and also in combination with any features of another embodiment example.

FIG. 1 shows a screw part 1 with an annular cross-section. The screw part 1 is in particular a hollow screw or a nut. The screw part 1 has a hollow cylindrical base element injection molded at least in part from a plasticized polymeric mass 2 containing fibers.

Preferably, the polymeric mass 2 is a resin or a thermoset. In particular, the polymeric mass 2 contains an epoxy resin (EP) or an unsaturated polyester resin (UP) or a vinyl ester resin (VE) or a phenol-formaldehyde resin (PF) or a diallyl phthalate resin (DAP) or a methacrylate resin (MMA) or a polyurethane (PUR) or an amino resin or a melamine resin (MF/MP) or a urea resin (UF).

In a preferred embodiment, the plastifi¬ed polymeric mass 2 forms a thermoplastic matrix. Preferably, the polymeric mass 2 consists of a polyamide (PA), for example a polyphthalamide (PPA) or a polypropylene (PP) or a polyetherketone (PEEK) or a polyphenylene sulfide (PPS) or a polysulfone (PSU), preferably a poly-phenyl sulfone (PPSU) or a polyether sulfone (PES) or a polyether¬imide (PEI) or a polyethylene terephthalate (PET) or a polybutylene terephthalate (PBT).

Figure 4:
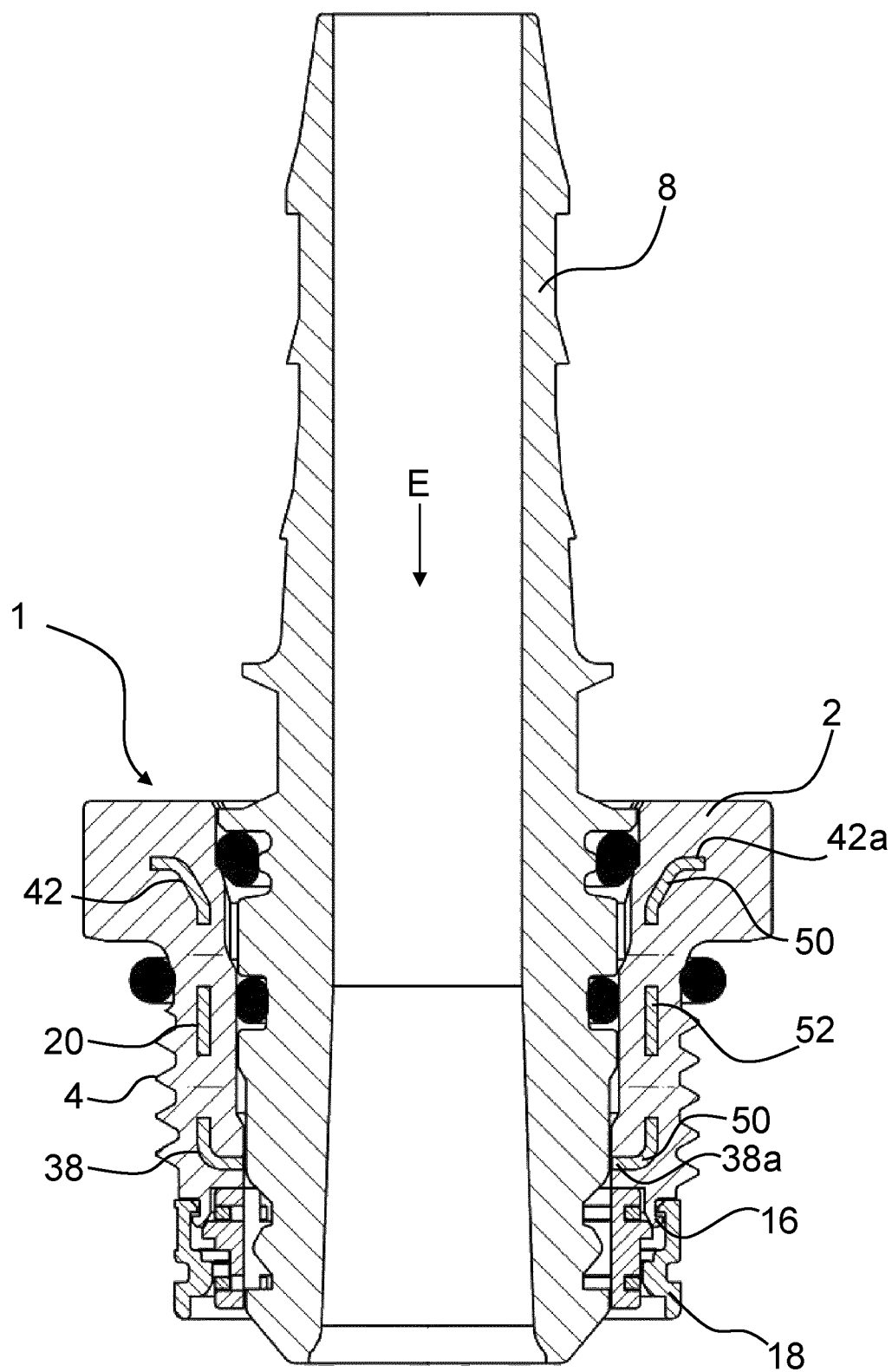
FIG. 4 is a longitudinal section through an assembly axial to the inner channel of the screw part, comprising a conduit system element and the screw part according to FIG. 1, FIG. 5 a perspective view of a first version of an insertion sleeve made of a sheet metal part.

According to the embodiment in FIGS. 1 and 4, the base element has at least one internal thread and/or one external thread 4. In the embodiments of the screw part 1 shown, the base element only has an external thread 4.

Furthermore, the base element has an inner channel 6 for arranging and/or passing through a conduit system element 8. FIG. 4 shows an example of a corresponding assembly, wherein a conduit system element 8 designed as a plug connector is arranged with a plug part in the inner channel 6. The conduit system element 8 is arranged and/or passed through in the inner channel in an insertion direction E.

The inner channel 6 has also formed at least one sealing section 10 for arranging a circumferential seal for sealing between the inner channel 6 and the conduit system element 8 and/or at least one support section 12 for supporting and/or guiding the conduit system element 8 and/or at least one retaining section 14 for directly or indirectly locking the conduit system element 8. Individual sections are identified by way of example in FIG. 1. The exact functions of the individual sections as well as their arrangement and design are known in particular from WO 2013/092234 A1.

According to the embodiment examples in FIGS. 1 and 4, the retaining section 14 is advantageously formed at an end of the inner channel 6 pointing in the insertion direction E. The insertion direction E is in particular the direction in which a conduit system element 8 is inserted into the screw part 1, in the embodiment example according to FIG. 4. In particular, the base element has an outer ring bead 16 on an outer wall in the region of the retaining section 14. An annular locking cage 18, exemplary in this example, can be fastened, in particular snapped on, to this outer ring bead 16 for indirect holding and/or locking of the conduit system element 8. Advantageously, the locking cage 18 cooperates with the conduit system element 8 in such a way that the conduit system element 8 can be locked relative to the screw part 1, in particular in the inner channel 6.

According to the invention, an insertion sleeve 20 is arranged in the base element coaxially with the inner channel 6, as shown in FIGS. 1, 4, 9 and 10. The insertion sleeve 20 is shown detached in FIGS. 5 and 11. According to the invention, the insertion sleeve 20 is at least partially encapsulated by the polymeric mass 2, so that the insertion sleeve 20 is at least partially surrounded by the polymeric mass 2 radially facing towards the inner channel 6 and radially away from the inner channel 6.

Particularly advantageously, in order to be able to transmit as high a torque as possible, the insertion sleeve 20, in particular in an arrangement in the base element according to FIG. 1, 4, 9 or 10, prevents symmetrical fiber alignment of the fibers in the plasticized polymeric mass 2 during manufacture, i.e. during injection molding. As a consequence, the fibers in the base element are intermixed and exhibit an asymmetric fiber orientation in the base element or polymeric mass 2.

The screw part 1 according to the invention is particularly advantageous in production by means of the insertion sleeve 20 in that a homogeneous asymmetrical fiber orientation is possible, even in the case of injection molding with only one injection point. In particular, this saves complex molding tools with complex sprue systems and material scrap caused by a polymeric mass 2 curing in the sprue system.

On the screw part 1, the asymmetrical fiber orientation in the base element has in particular the advantages that the screw part 1 is particularly susceptible to one or more load cases acting in a specific direction due to the fiber orientation, so that material-related different resistance zones within the screw part 1 are avoided.

Furthermore, the insertion sleeve 20 is advantageous in the sense that the screw part 1 has a reduced loss of pretensioning force, since in a critical cross-section of the screw part 1 an axial pretensioning force generated by a screwing operation is additionally absorbed and held by the insertion sleeve 20.

Figure 10:
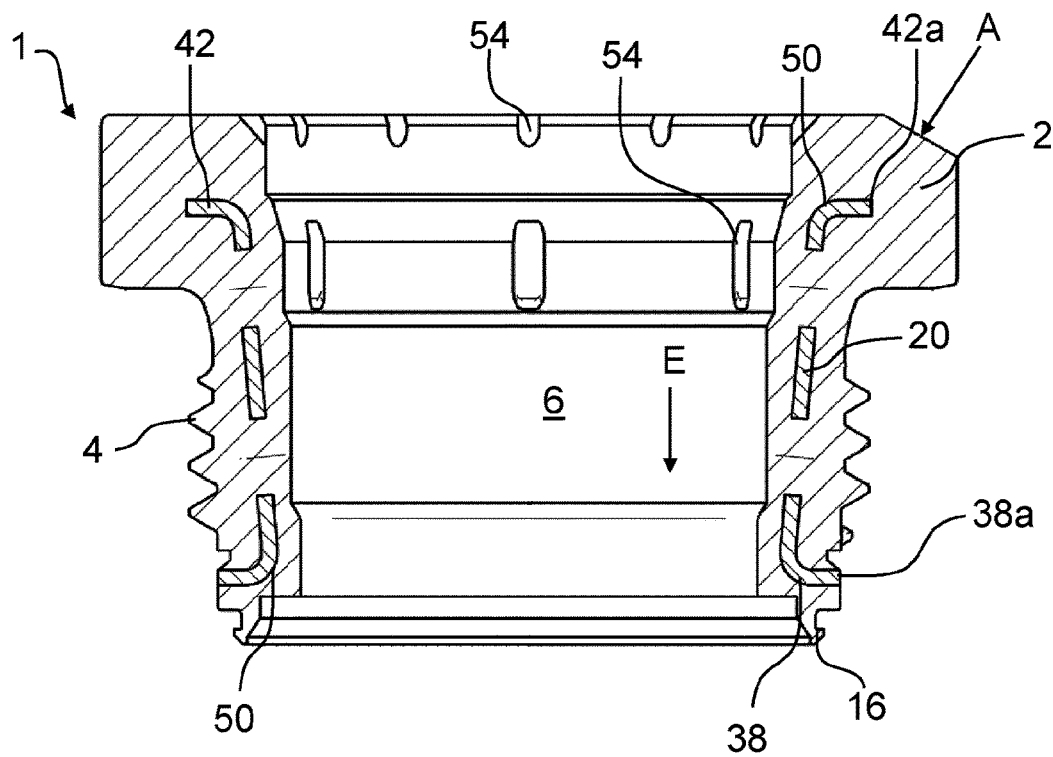
FIG. 10 is a longitudinal section through a further embodiment of the screw part axially to the inner channel of the screw part.

In accordance with the embodiments shown in FIGS. 1, 4 and 10, in an advantageous embodiment the base element has an axially extending mounting section 22 and an axially extending threaded section 24. The base element advantageously has a thread in the threaded section 24, wherein in the embodiments shown an external thread 4 is formed in the threaded section 24 on an outer wall of the base element. Alternatively, according to an embodiment not shown, the base element has an internal thread formed in the inner channel 6 and/or as a coaxial extension of the inner channel 6. The respective sections are only marked in FIG. 1 for better clarity.

In particular, the mounting section 22 serves to transmit an externally generated torque to the screw part 1. Preferably, therefore, the base element in the mounting section 22 has a force engagement which is suitable, for example, for a tool or, due to a particularly grippy outer contour 26, is suitable for manual gripping, holding and turning by a user.

In the embodiment of the screw part 1 with a mounting section 22 and a threaded section 24, it has proved particularly advantageous if the insertion sleeve 20 is arranged in the base element at least partially in the mounting section 22 and at least partially in the threaded section 24. This advantageous embodiment is shown, for example, in FIGS. 1 and 4.

In particular, FIGS. 1 and 10 also show an advantageous embodiment according to which the insertion sleeve 20 is formed and arranged in the base element in such a way that the insertion sleeve extends partially over the functional sections of the inner channel 6. In FIG. 1, it is shown by way of example that the insertion sleeve 20 extends over a first and second as well as a support section 12. According to an advantageous embodiment, not shown, the insertion sleeve 20 extends over all functional sections of the inner channel 6, in particular over at least one retaining section 14, over at least one sealing section 10 and at least one support section 12.

Figure 9:
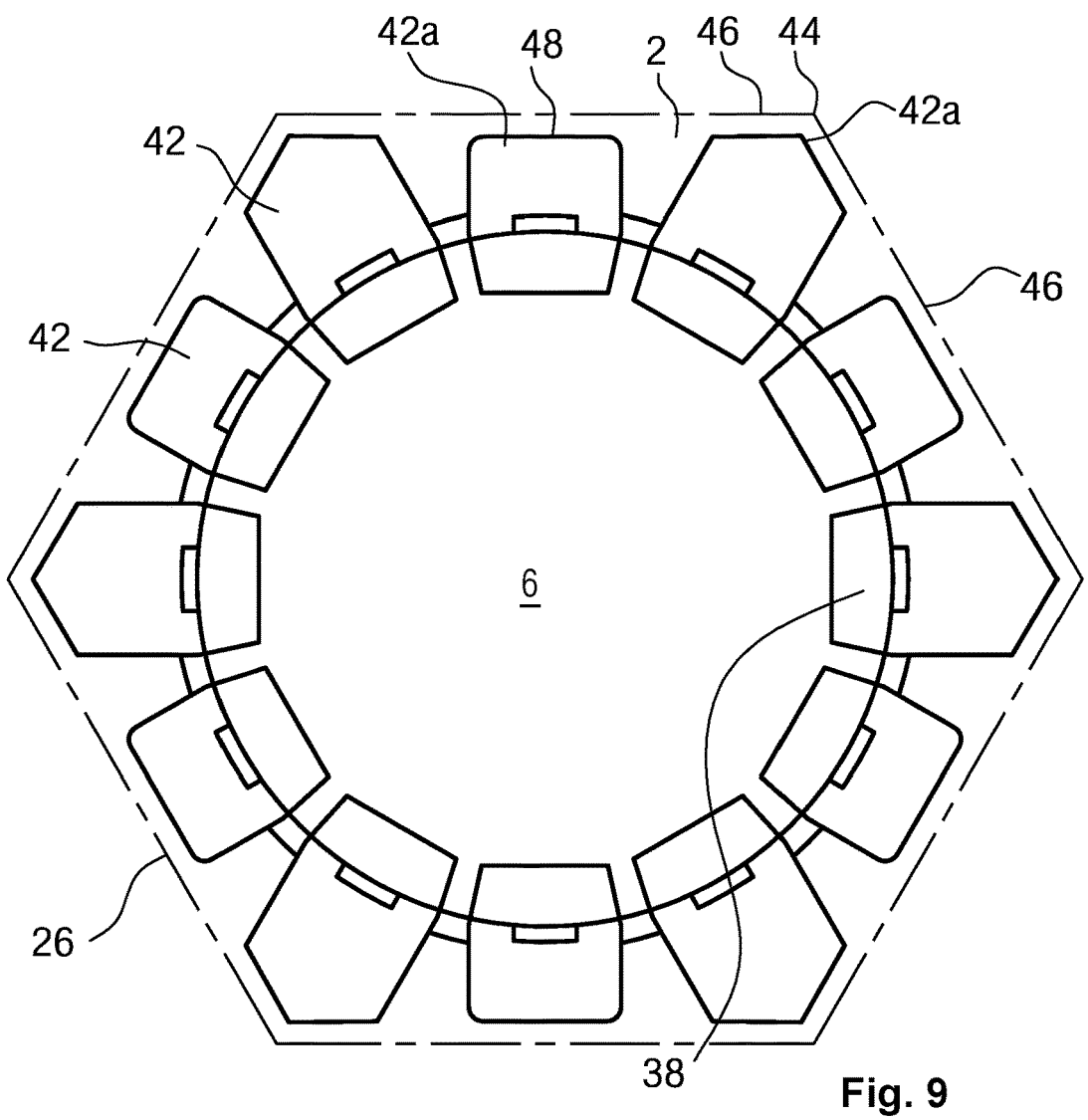
FIG. 9 is a top view of a screw part in the insertion direction with a partially transparent base element and with the insertion sleeve formed from a sheet metal part according to FIG. 8.
Figure 11:
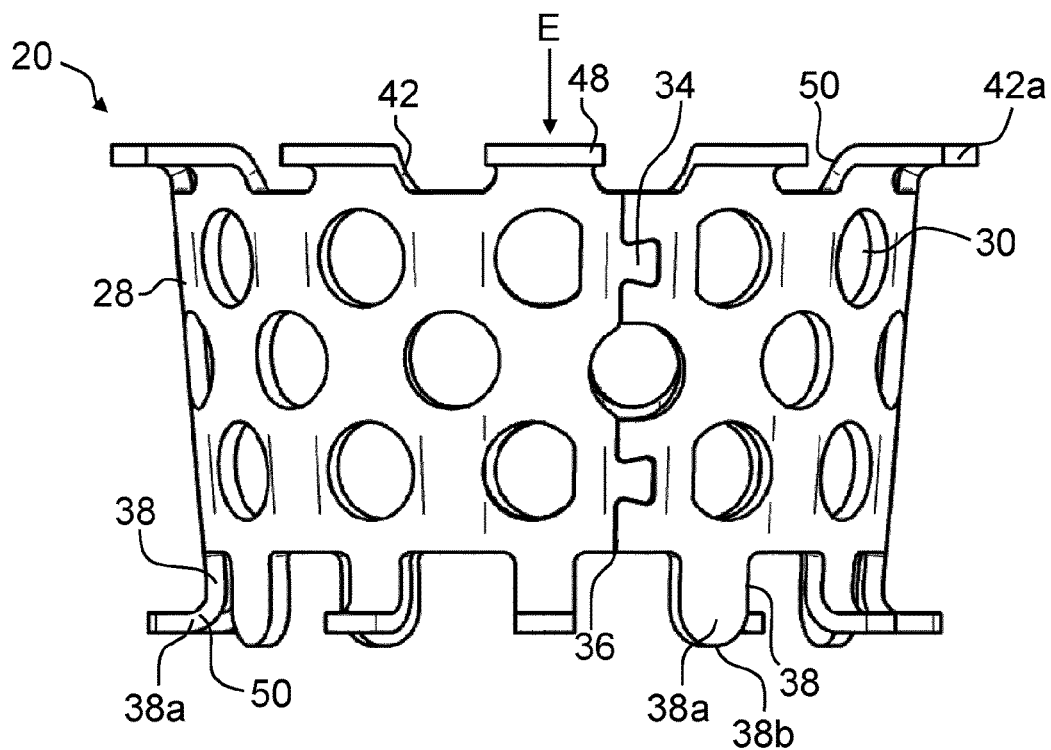
FIG. 11 is a perspective view of a cone-like design of the insertion sleeve.
Figure 12:
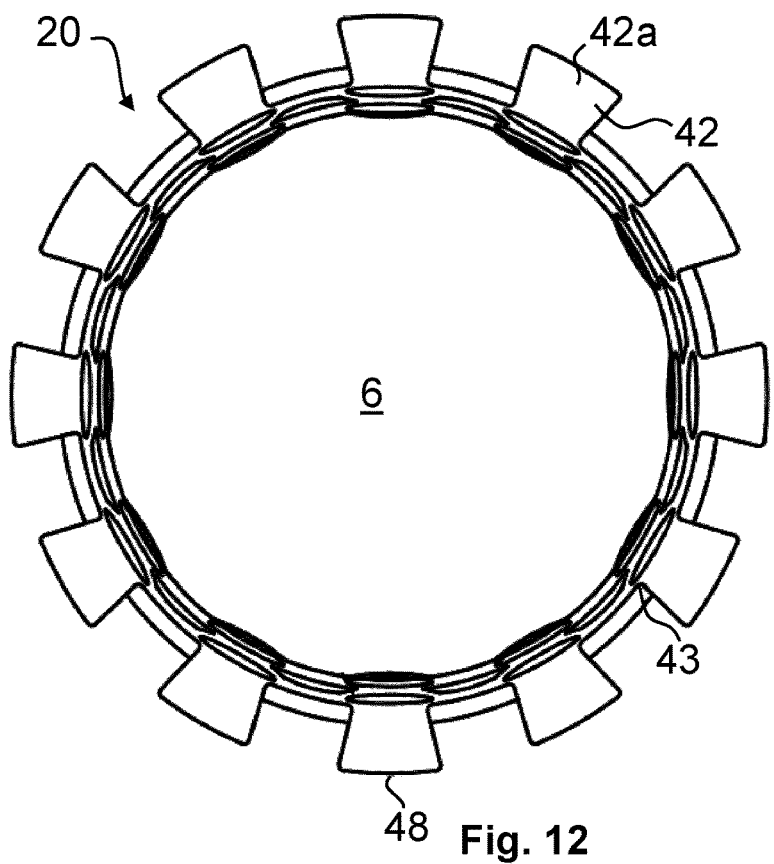
FIG. 12 is a top view in an insertion direction E of the insertion sleeve according to FIG. 11.

Expediently, the insertion sleeve 20 has a circumferentially closed ring profile in a top view axial to the inner channel 6, as exemplarily shown in FIGS. 9, 11 and 12. The closed ring profile is particularly suitable for resisting forces acting radially on the insertion sleeve 20 or on the screw part 1. In particular, such forces occur in the screw part 1 when it is screwed together at the thread or in the threaded section 24.

According to FIGS. 5 to 8, 11 and 13, in a further embodiment the insertion sleeve 20 has openings 30 distributed circumferentially in a circumferential wall 28. According to the embodiments shown, the openings 30 have an opening proportion of at least 30% of the circumferential wall 28 according to an advantageous embodiment of the insertion sleeve 20. Expediently, the openings 30 are filled by the plasticized polymeric mass 2 during injection molding, so that the insertion sleeve 20 is thereby positively arranged in the polymeric mass 2 in the base element. Another advantage of the openings 30 is that mixing of the fibers or fiber orientation is favored during injection molding.

Preferably, as shown in FIGS. 5 to 8, 11 and 13, the openings 30 are arranged circumferentially in a row of openings in the insertion sleeve 20, with a plurality of rows of openings being arranged in particular over the axial extent of the insertion sleeve 20. Expediently, the insertion sleeve 20 has three rows of openings, as shown in FIGS. 5 to 8, 11 and 13. Preferably, the openings 30 are arranged offset from one another in such a way that the openings 30 of one opening row are arranged circumferentially offset from the openings 30 of at least one axially adjacent opening row.

By using the insertion sleeve 20 according to the invention, in particular having said openings 30, only one injection point is required for injection molding of the screw part 1. Preferably, the injection point is arranged in the threaded section 24, wherein the plasticized polymeric mass 2 can be injected into a cavity of the molding tool radially or axially to the inner channel 6. Likewise, the injection point may be arranged in the mounting section 22. In this case, the plasticized polymeric mass 2 is injected axially with respect to the inner channel 6, i.e. in particular perpendicular to the force engagement, in the insertion direction E. In an advantageous further embodiment, the injection point is arranged at an angle to the inner channel, as shown in FIG. 10. In FIG. 10, the injection point or the injection direction of the polymeric mass 2 is marked A. Advantageously, this means that a valve gate can be used, i.e. without loss in relation to a sprue.

A useful embodiment of the openings 30 provides that a wall thickness of the insertion sleeve 20 or of the circumferential wall 28 and/or a size of the openings 30 is greater than or equal to a fiber length of the fibers contained in the polymeric mass 2.

In particular, as shown in FIGS. 5 to 8, the openings 30 are formed as circular holes. Preferably, the holes each have a pitch circle diameter in the range of 1 mm to 3 mm, preferably in the range of 1.5 mm to 2.5 mm.

Alternatively to the circular shape, the openings 30 are angular, oval or formed as elongated holes according to an example of embodiment not shown.

Figure 5:
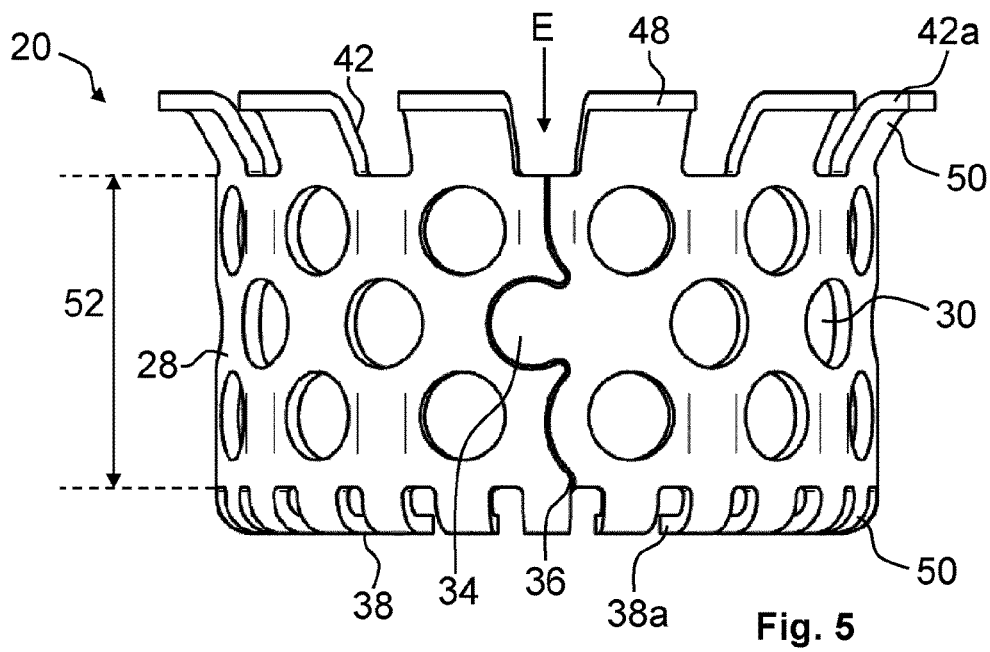

According to a variant of the screw part 1, the insertion sleeve 20 is formed as a sheet metal part 32, exemplarily shown in FIGS. 6 to 8, 11 and 12, which in particular has a hollow cylindrical shape, exemplarily shown in FIG. 5.

Expediently, the openings 30 of the insertion sleeve 20 are made in the circumferential wall 28 of the sheet metal part 32 by means of a cutting or punching process. It is expedient that the insertion sleeve 20, which is formed in particular as a sheet metal part 32, is tapered in diameter in the manner of a cone pointing in the direction of insertion E. This design is shown by way of example in FIGS. 10 to 13.

Particularly advantageously, the insertion sleeve 20 is a stamped bending element, the sheet metal part 32 being stamped out of a sheet in a stamping step together with the openings 30. Expediently, the manufacture of the insertion sleeve 20 thereby comprises at least one stamping step for manufacturing the sheet metal part 32 and a forming step for forming the sleeve-like geometry.

According to an advantageous embodiment not shown, the insertion sleeve 20 is formed as a skeletal supporting structure with supports and beams, wherein the openings 30 are formed as polygons enclosed by the supports and beams. In particular, a lattice structure or a mesh structure represents a skeleton-like supporting structure with supports and beams in the sense of the invention, wherein expediently also the skeleton-like supporting structure is created planar in a first step and is bent into a sleeve-like shape about a central sleeve axis 20 to the insertion sleeve 20 in a further step. In particular, the insertion sleeve 20 is arranged with the central sleeve axis coaxial with the inner channel 6 in the manufactured screw part 1.

Figure 6:
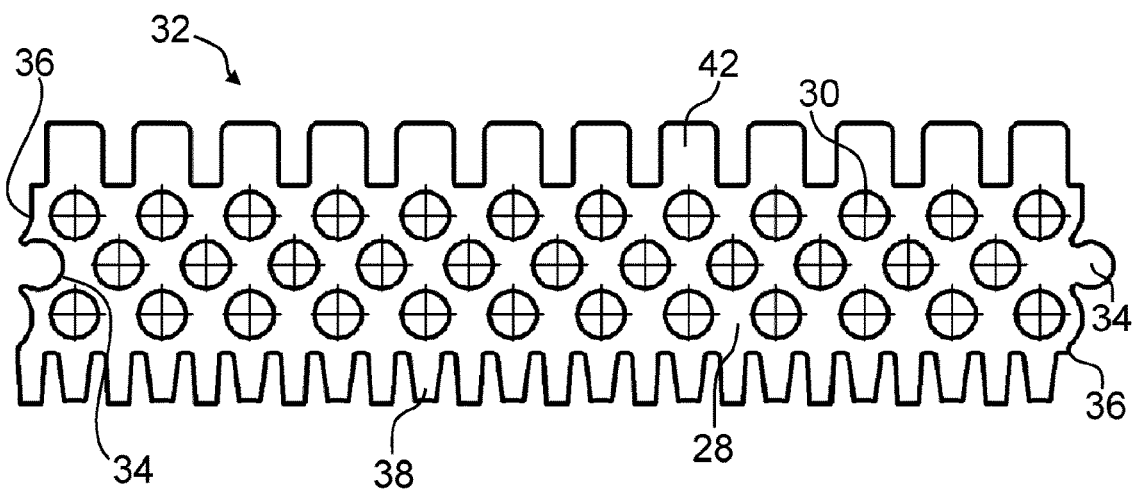
FIG. 6 is a top view of a flat side of an undeformed sheet metal part of the first version of the insertion sleeve according to FIG. 5.
Figure 7:
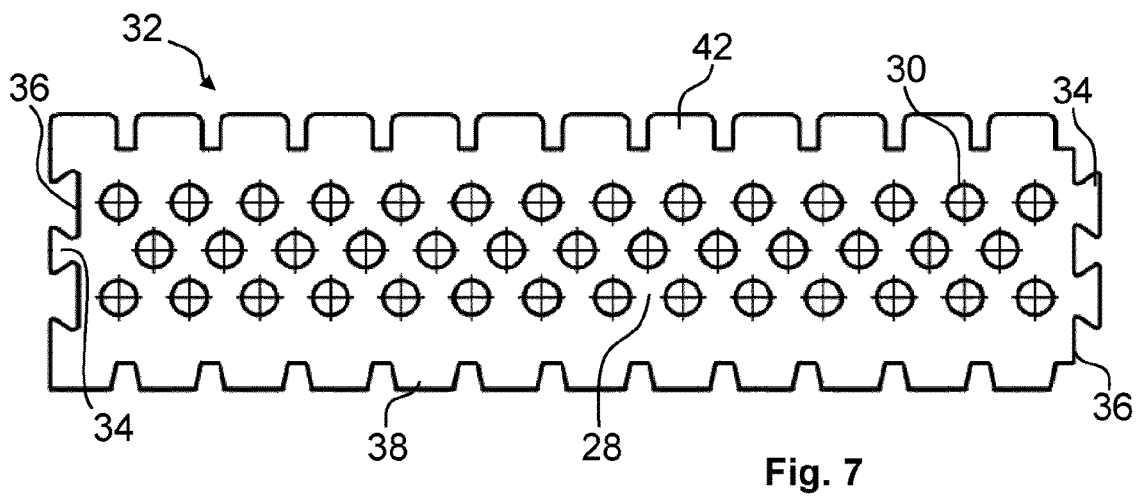
FIG. 7 is a top view of a flat side of an undeformed sheet metal part of a second version of an insertion sleeve.
Figure 8:
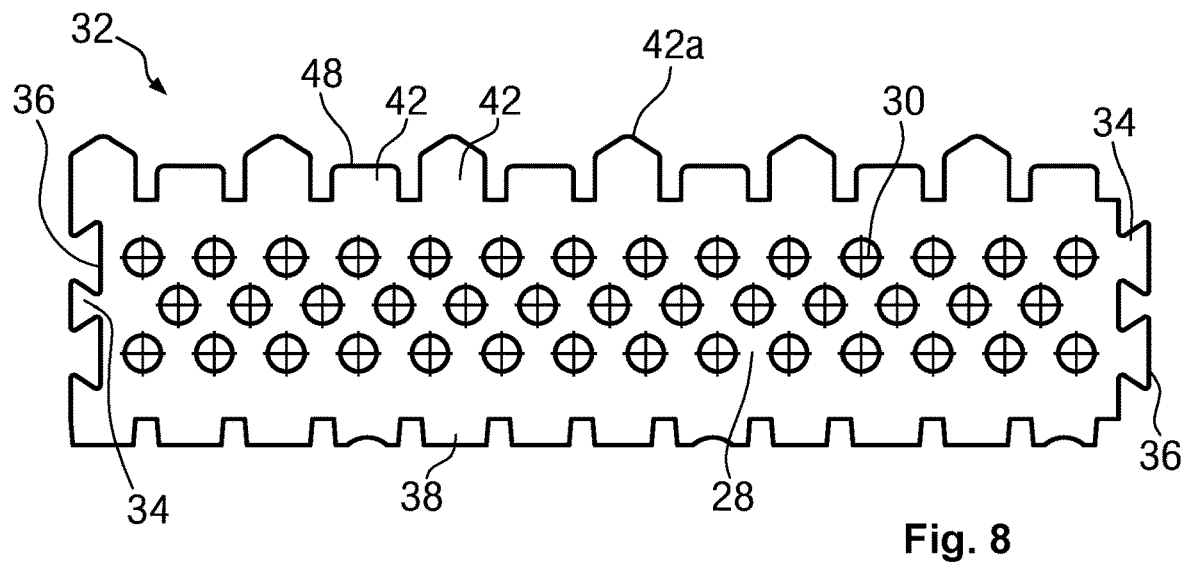
FIG. 8 is a top view of a flat side of an undeformed sheet metal part of a third version of the insertion sleeve.

Advantageously, the insertion sleeve 20, as aforementioned, is formed from a bending element bent into a sleeve. To ensure that the sleeve-like shape of the insertion sleeve is retained even in the case of a load acting radially outwardly or radially inwardly, a first embodiment, shown in particular in FIGS. 5 to 8 and 11, consists in two outer edges 36 of the bending element, which are bent together, each engaging positively in one another with a contour 34 for mutual connection. In particular, FIGS. 5 and 6 show a first advantageous contour 34 and FIGS. 7 and 8 show a second advantageous contour 34, the type of contour 34 depending on the particular application. In addition, these contours 34 can be wedged or caulked in the case of positive connection for backlash-free connection. In this case, for example, an improved clamping effect between the contours 34 can be achieved by material displacement.

A further advantageous embodiment for retaining the sleeve-like shape of the insertion sleeve 20 provides that the two bent-together outer edges 36 of the bending element are joined to one another by material bonding, for example by welding. In particular, the two outer edges 36 may also have a aforementioned contour 34 so that the outer edges 36 are held in an advantageous position by the form-fit connection for the material-fit connection.

According to an advantageous embodiment not shown, the insertion sleeve 20 is formed as a perforated deep-drawn part. Advantageously, this results in no outer edges 36 which have to be bent together and joined.

According to FIGS. 1, 4 and 8, in one variant the insertion sleeve 20 has formed at least at one axial end at least two, preferably three or more, webs 38 distributed over the circumference of the insertion sleeve 20. The webs 38 are advantageously formed facing the inner channel 6. Preferably, the total number of webs 36 is so large that an almost closed circle is formed.

In particular, FIG. 6 shows an advantageous sheet metal part 32 of an insertion sleeve 20 with twenty-four webs 38. Advantageously, FIGS. 7 and 8 each illustrate an advantageous sheet metal part 32 of an insertion sleeve having twelve webs 38. Advantageously, the webs 38 improve the arrangement of the insertion sleeve 20 in the base element.

In particular, at least two, preferably three, webs 38 each project from the polymeric mass 2 with an end section 38a facing the inner channel 6, as shown in FIG. 2. Expediently, the end sections 38a of the webs 38 project out of the polymeric mass 2 in the support section 12 or a non-functional section of the inner channel 6. Expediently, this support section 12 or non-functional section of the inner channel 6 is arranged axially adjacent to the sealing section 10 and/or the retaining section 14 and, in particular, does not serve to apply a circumferential seal or to lock the conduit system element 8. The protruding end sections 38a can thereby be used particularly advantageously during manufacture for the arrangement, in particular the axial and radial positioning and clamping, of the insertion sleeve 20 within the cavity of the molding tool.

The protruding webs 38 or their end sections 38a protrude in particular into the inner channel 6, which expediently carries a fluid. According to a preferred application, a compressed air brake system, the inner channel 6 is supplied with dried air. Thus, advantageously in this application, no condensates enter the exit points of the webs 38 from the polymeric mass 2.

To produce the screw part 1, the plasticized polymeric mass 2 containing fibers is injected into the cavity of the molding tool through at least one injection opening of a molding tool not shown and, after solidification, is demolded from the molding tool as screw part 1.

Preferably, the inner channel 6 is created by inserting suitable core parts into the molding tool. Corresponding to the screw part 1 shown in FIG. 1, one variant of the production process has a molding tool with a multi-part core comprising at least two core parts which are arranged adjacent to one another axially to the inner channel 6 when the cavity is formed. In particular, the multi-part core allows the diameter of the inner channel 6 to change in the individual sections, with the inner channel 6 having its smallest diameter at a contact point of the core parts and the diameter of the inner channel 6 remaining the same or increasing from the contact point in or against the insertion direction E. In particular, at least two core parts are used, the insertion sleeve 20 being supported on a core part 41 with the webs 38 during injection molding or being braced between two core parts. Expediently, the insertion sleeve 20 according to the embodiment example in FIG. 1 is clamped between two core parts with three end sections 38a of the webs 38.

According to one embodiment of the screw part 1, at least one axially extending groove 40 is formed in a circumferential section of the inner channel 6, in which one of the webs 38 protrudes from a groove base. Preferably, the respective web 38 has a maximum radial height corresponding to a depth of the groove 40. In particular, the web 38 thereby does not protrude into a section of the inner channel 6 which is circular in cross-section, so that a conduit system element 8 which is to be arranged and/or locked in the inner channel 6 does not come into material contact with one or more of the webs 38. Expediently, the groove 40 can be created with at least two core parts, the core parts being formed at their point of contact corresponding to the webs 38, so that the webs 38 are held clamped with their end sections in the cavity of the molding tool during injection molding. In particular, the groove 40 is represented by a clamping part formed on at least one core part, which is overmolded during injection molding. This clamping part expediently has a clamping width which corresponds to a width of the groove of the manufactured screw part and is greater than or equal to the width of the web 38 plus the distance between two webs 38. Advantageously, this embodiment ensures that at least one clamping width is clamped within a groove 40 as the sum of one or two web sections.

Preferably, the clamping portions are formed as crenellated projections, with the webs 38 being clamped between the crenellated projections of the two core parts. This gives the advantage that the core parts are interlocked, so that the insertion sleeve 20 can be pre-positioned and held securely during a closing of the molding tool. Preferably, the insertion sleeve is pre-positioned on a longer core part, the longer core part being that which is outside at least two mold jaws when the molding tool is open.

According to a further variant, which can be implemented as a supplement or alternative to the aforementioned design of the webs 38, at least one web 38 is designed to point radially outwards from the inner channel 6. This embodiment is shown in particular in FIGS. 11 and 12. Expediently, and also shown in FIGS. 11 and 12, at least one web 38 is preferably formed as an alternative or supplementary embodiment facing axially towards the inner channel 6. FIGS. 11 and 12 show an advantageous combination according to which the insertion sleeve 20 has both webs 38 facing radially outwards and webs 38 facing axially towards the inner channel 6. According to an embodiment not shown, the insertion sleeve 20 expediently has webs 38 pointing radially towards the inner channel 6, radially outwards from the inner channel 6 and also pointing axially towards the inner channel 6.

Figure 13:
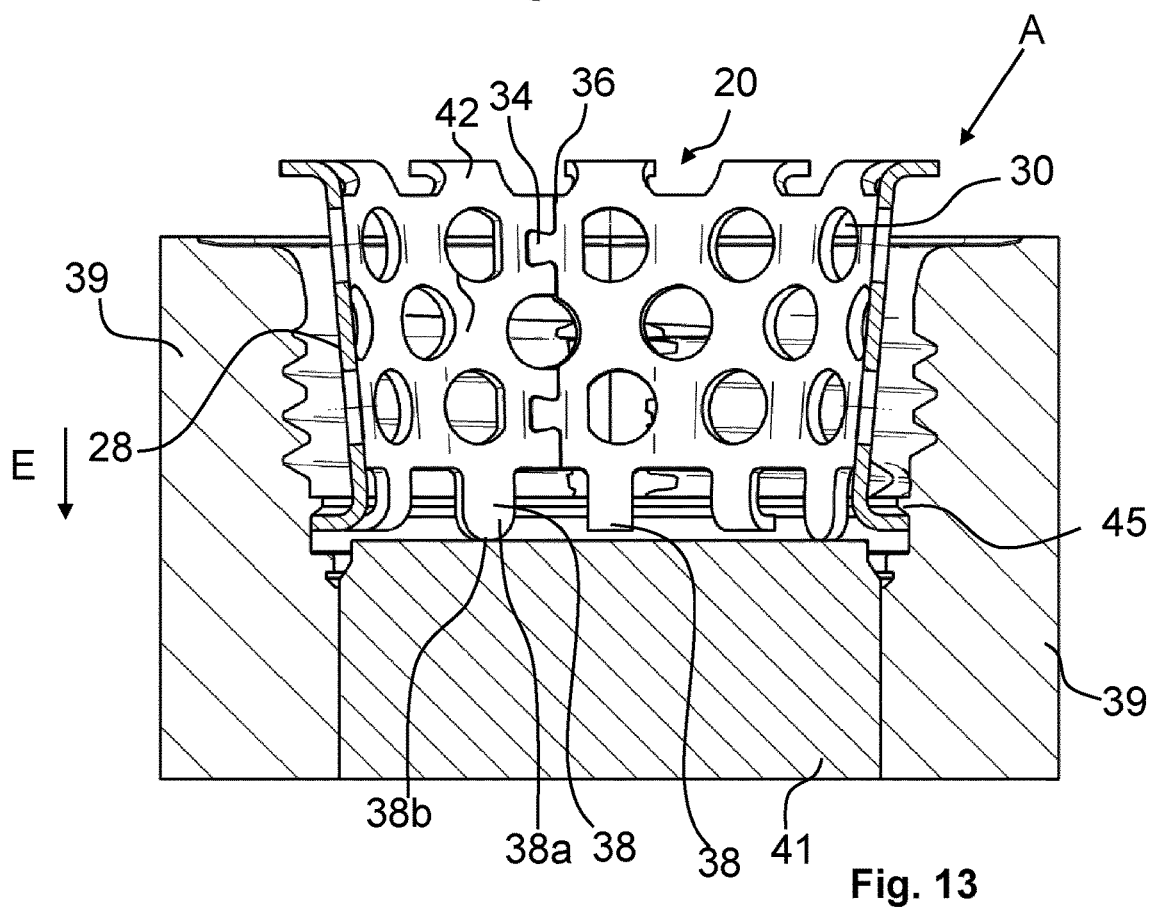
FIG. 13 is a longitudinal section through a part of a molding tool and an insertion sleeve inserted into the molding tool according to FIG. 11.

FIGS. 11 and 13 also show a preferred variant of the webs 38 facing axially towards the inner channel 6, according to which the webs 38 facing axially towards the inner channel 6 have rounded end sections 38b for resting on a core part 41 of the molding tool. In particular, the rounded end sections 38b improve the filling of the base element with the polymeric mass 2.

Figure 14:
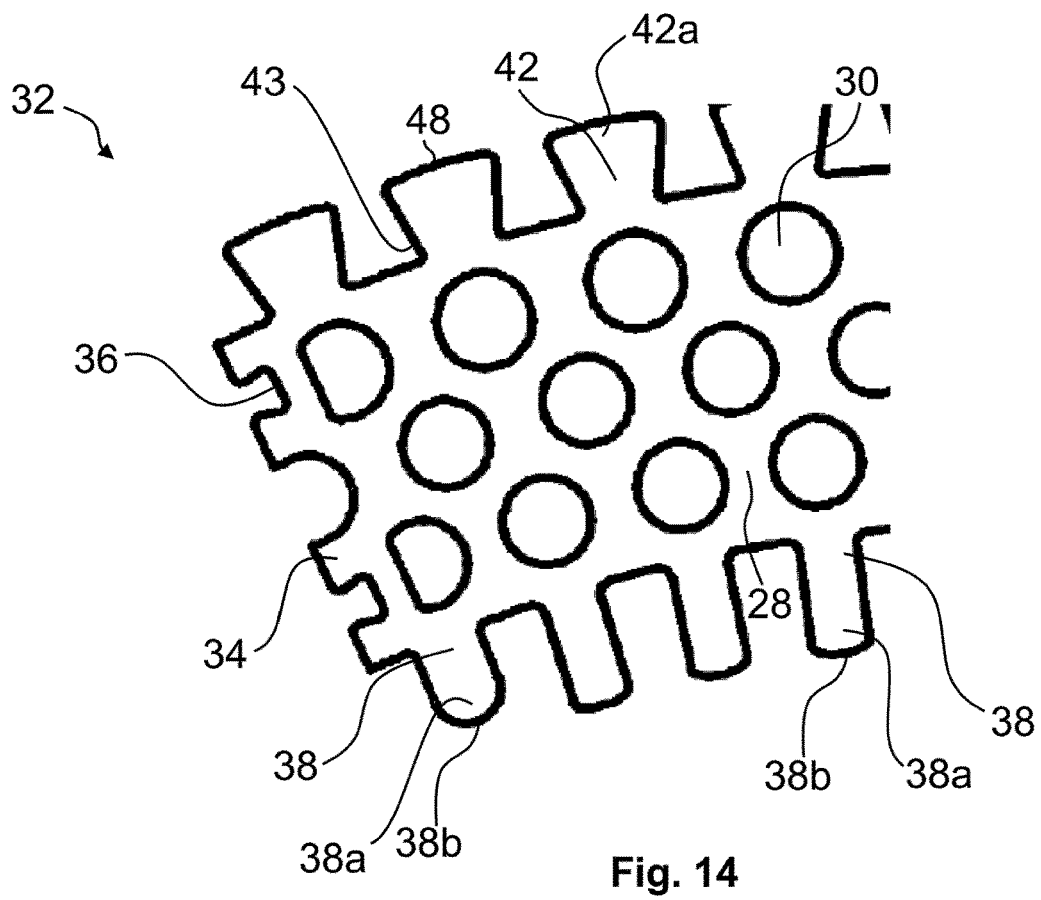
FIG. 14 is a section of a top view of a flat side of an undeformed sheet metal part of a further version of the insertion sleeve according to FIG. 11.
Figure 15:
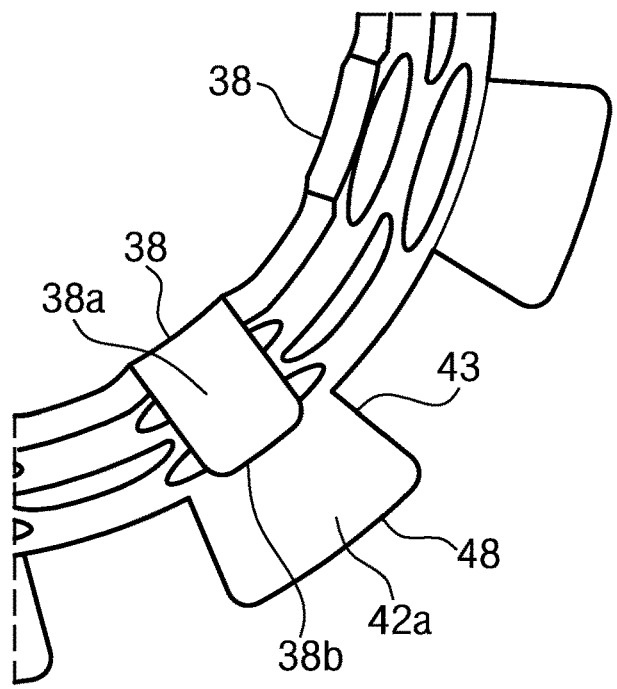
FIG. 15 is a section of a top view of the insertion sleeve according to FIG. 11 against the insertion direction E.

According to an advantageous embodiment illustrated in FIGS. 14 and 15, the radially outwardly angled webs 38 are also formed with rounded end sections 38b. The rounded end sections 38b of the axially and/or radially pointing webs 38 preferably have a large radius, or different radii, which have the effect of providing a wide bearing surface or contact surface to the sliders 39 of the molding tool. This has the advantage that the webs 38 can be more uniformly tensioned.

In accordance with one such embodiment, the insertion sleeve 20 bears against the sliders 39 of the molding tool with the webs 38 angled outwardly, as shown in FIG. 13. Furthermore, the insertion sleeve 20 can rest on the core part 41 with the webs 38 extending axially in the insertion direction, as shown in FIG. 13. In particular, at the contact points between the webs 38 and the molding tool, the webs 38 emerge from the polymeric mass.

According to the advantageous embodiment, the outwardly facing webs 38 may be supported in the slides 39. Expediently, the outwardly facing webs 38 can cooperate with sliders 39, which have a sloping surface 45 facing at least partially in the insertion direction, in such a way that the position of the insertion sleeve 20 in the molding tool is secured axially and radially during injection molding.

The injection molding of the screw part 1 shown in FIGS. 10 to 13 can be carried out essentially in accordance with the aforementioned injection molding process described for FIGS. 1 to 9, with the position of the contact surfaces between the insertion sleeve 20 and the molding tool changing in accordance with the directions in which the webs 38 extend.

Advantageously, the insertion sleeve 20 has formed in the mounting section 22 at least six, preferably twelve, teeth 42 distributed over the circumference of the insertion sleeve 20. Advantageously, the teeth 42 extend at least with an end section 42a outwardly into the force engagement. The teeth 42 effect a preferred torque transmission in the mounting section 22 to the insertion sleeve 20, with a good force transmission to the threaded section 24 being ensured in particular via the openings 30.

In particular, the teeth 42 are arranged such that they do not protrude from the polymeric mass 2 or form a common surface therewith. Preferably, the teeth 42 are embedded so deeply in the polymeric mass 2 that they are completely covered by a polymeric layer which advantageously prevents, in particular, the entry of water. In particular, this design is preferred to prevent frost damage.

According to a preferred variant of the teeth 42, the end sections of the teeth 42 are designed to widen towards the force engagement, so that in a top view axial to the inner channel 6, as shown in FIG. 12, the end sections of the teeth 42 are trapezoidal. Advantageously, the end sections of the teeth 42 have an undercut 43 facing the inner channel 6 due to the trapezoidal shape. By means of the undercut 43, the maximum transmittable torque is improved and a pull-out protection is improved in case of large force engagement on the force engagement. In particular, as the polymeric mass 2 flows around the undercuts 43 during the manufacture of the screw part 1, it is advantageously made more difficult to pull off the force engagement from the insertion sleeve 20 after solidification of the manufactured screw part 1.

Expediently, the force engagement is formed with a regularly convex polygonal outer contour 26. For example, in accordance with the embodiments in FIGS. 3 and 9, the force engagement is formed as a hexagonal profile, which is particularly advantageous for torque transmission with a corresponding tool. Preferably, at least one tooth 42 of the insertion sleeve 20 is associated with a corner point 44 of the polygonal outer contour 26 and, according to an advantageous embodiment, extends radially to this associated corner point 44. In particular, this embodiment possibility is shown in FIG. 9.

According to a further embodiment, the teeth 42 are not adapted to the outer contour 26 of the force engagement. This has the advantage that the insertion sleeve does not have to be positioned and aligned with respect to the outer contour 26 of the screw part 1. In particular, the designs of the undeformed sheet metal parts 32, as shown in FIGS. 6 and 7, are suitable for such an arrangement of the insertion sleeve, which is undefined to the outer contour 26, due to their homogeneous tooth profile.

Also shown in FIG. 9 is a further preferred variant according to which the end sections 42a of the teeth 42 of the insertion sleeve 20, which are assigned to a corner point 44, are designed to converge at an angle in the direction of the corner point. It has proved advantageous if the angle at which the respective end section 42a converges corresponds to an inner angle which the two sides 46 of the polygonal outer contour 26 converging at this corner point 44 enclose. In particular, this embodiment allows the respective tooth 42 to extend a large radial distance into the corner points 44 of the force engagement, so that a torque acting on the force engagement can be better absorbed.

In this advantageous aspect, an alternative or complementary embodiment provides that in the force engagement formed with the regularly convex polygonal outer contour 26, advantageously at least one tooth 42 is associated with a side 46 of the polygonal outer contour 26. This embodiment is shown in combination with the aforementioned embodiment in FIG. 9. In particular, the respective tooth 42 extends in the direction of a point on the respective side 46, the point being located halfway along the side 46, and the end section 42a of the tooth 42 in particular having an end face 48 extending parallel to the respective side 46. As shown in FIG. 9, the tooth 42 can approach as closely as possible the side 46 of the outer contour 26 of the force engagement by its parallel end face 48.

Expediently, the insertion sleeve 20 is formed and arranged in the base element in such a way that the teeth 42 are arranged, at least with their end sections, in a region between a center of the axial extent of the mounting section and an upper third of the axial extent of the mounting section 22, viewed against the insertion direction E.

Particularly advantageously, the webs 38 and/or teeth 42 each have a transition section 50 between a sleeve base 52 of insertion sleeve 20 and their respective end section 38a, 42a. This advantageous design is shown in FIGS. 1, 4 and 5 in the case of the teeth. In this case, the transition section 50 includes, extending obliquely to the base 52 of the insertion sleeve 20, a first angle with the base 52 of the insertion sleeve 20 and a second angle with the respective end section 38a, 42a. In particular, the transition section 50 is dimensioned and oriented such that the end section 38a, 42a extends perpendicular to the inner channel 6. Advantageously, a 60° angle has been found for the first angle which the transition section 50 includes with the base 52. The transition section 50 enables advantageous adaptation of the insertion sleeve 20 to a change in diameter of the inner channel 6 in the mounting section 22, as shown in FIGS. 1 and 4.

As an alternative to forming the transition section 50 with two angles, the transition section 50 may be formed in a rounded manner as shown correspondingly in FIGS. 1, 4 and 5 with respect to the webs 38.

In accordance with the foregoing, the conduit system element 8 is preferably insertable into the inner channel 6 in the insertion direction E and lockable in the inner channel 6. Particularly for pressure applications, for example when used in a compressed air system, the formation of controlled leakage paths is advantageous. For the purpose of forming them, axially extending recesses 54 are arranged in the circumferential section of the inner channel 6. In particular, FIGS. 1 and 3 show this advantageous formation of recesses 54, which form leakage paths. In the event of incorrect assembly or excess pressure in the piping system, the leakage paths enable a fluid to escape in a controlled manner that can be perceived visually and/or acoustically.

In order to enable the aforementioned embodiments, it has been found to be advantageous if the insertion sleeve 20 is formed from a metallic material, in particular a VA steel or aluminum or an organo-sheet. Expediently, the organo-sheet consists, in particular, of a laminate of fibers, preferably carbon or glass fibers, with plastic, expediently a polyamide. Expediently, these materials offer excellent protection against thickening caused by corrosion, which could lead to the screw part 1 bursting open. This protection is particularly advantageous since the (plasticized) polymeric mass 2 may have moisture at a low level.

Preferably, the fiber-containing plasticized polymeric mass 2 of the base element has a volume fraction of fibers in the range from 2.5% to 75%, in particular from 14% to 40% and/or a mass fraction of fibers from 30% to 75%, preferably from 50% to 65%. These mass or volume ratios are particularly advantageous for the stability of the screw part 1.

It has also been shown to be advantageous for the stability of the screw part 1 if, according to an advantageous embodiment, the fibers have a length in the range from 0.1 mm to 10 mm, preferably the fibers are formed as short fibers having a length in the range from 0.2 mm to 0.5 mm or as long fibers having a length in the range from 1 mm to 10 mm and/or the fibers have an average diameter in the range from about 3 μm to 35 μm, preferably an average diameter in the range from 5 μm to 20 μm. In particular in the case of a screw part 1 with an insertion sleeve 20, which has the openings 30, the fiber length is preferably smaller than or approximately equal to, in particular at most equal to, the size of the opening 30, in particular the pitch circle diameter.

Advantageously, amorphous fibers, such as glass fibers, anisotropic fibers, such as carbon fibers, and/or aramid fibers can be used as fibers in the polymeric mass 2.

According to a process of manufacturing the screw part 1 according to at least one of the aforementioned embodiments, the screw part 1 is manufactured using an injection molding process which provides only one injection point for injecting the polymeric mass 2.

It is also advantageous for the production if the injection point is arranged at an angle to the inner channel of the screw part to be produced in such a way that the polymeric mass is injected into a closed molding tool at an angle facing the inner channel. The advantage of angled injection is that more free space is available for the core part in the area of the inner channel, which is formed by the core part that can be inserted perpendicularly in the insertion direction. In particular, this design allows the corresponding core part of the molding tool to be actively cooled by means of core cooling. The core cooling advantageously increases the production speed and extends the service life of the molding tool, in particular of the core part. In FIG. 10, the injection point and the injection direction of the polymeric mass 2 are indicated by the arrow A.

In particular, the process for manufacturing the screw part uses a hot runner system for injection molding, which, in combination with a core part with a core cooling system, leads to particularly efficient production.

The invention is not limited to the embodiments shown and described, but also includes all embodiments having the same effect in the sense of the invention. It is expressly emphasized that the embodiments are not limited to all features in combination, rather each individual sub-feature may also have inventive significance in isolation from all other sub-features. Furthermore, the invention has not yet been limited to the combination of features defined in claim 1 either, but can also be defined by any other combination of certain features of all the individual features disclosed as a whole. This means that in principle virtually any individual feature of claim 1 can be omitted or replaced by at least one individual feature disclosed elsewhere in the application.

The invention claimed is:

1. A screw part for engaging a conduit system element, the screw part having an annular cross-section, the screw part comprising a base element which is hollow cylindrical and at least partially injection-molded from a plasticized polymeric mass containing fibers, the base element having at least one external thread and an inner channel for arranging and/or passing therethrough the conduit system element in an insertion direction (E), wherein the inner channel has at least one sealing section for arranging a circumferential seal for sealing between the inner channel and the conduit system element, and/or at least one support section for supporting and/or guiding the conduit system element, and/or at least one retaining section for directly or indirectly arresting the conduit system element, an insertion sleeve arranged in the base element coaxially with the inner channel, the insertion sleeve is formed as a sheet metal part having a hollow cylindrical shape and is at least partially encapsulated by the polymeric mass so that the insertion sleeve is at least partially surrounded by the polymeric mass radially facing towards the inner channel and radially away from the inner channel.

2. The screw part according to claim 1, wherein the base element has an axially extending mounting section and an axially extending threaded section, the base element further having a force engagement in the mounting section and an external thread on an outer wall in the threaded section, the insertion sleeve being arranged in the base element at least partially in the mounting section and at least partially in the threaded section.

3. The A screw part according to claim 2, wherein the insertion sleeve has formed in the mounting section at least six teeth distributed over a circumference of the insertion sleeve, the teeth extending at least with one end section outwardly into the force engagement.

4. The screw part according to claim 3, wherein the end sections of the teeth widen facing the force engagement in such a way that in a top view axially to the inner channel the end sections of the teeth are formed trapezoidal in such a way that the end sections of the teeth facing the inner channel have an undercut.

5. The screw part according to claim 4, wherein the force engagement is formed with a regularly convex polygonal outer contour, at least one tooth of the insertion sleeve being associated with a corner point of the polygonal outer contour and extending radially to the associated corner point.

6. The screw part according to claim 5, wherein the end sections of the teeth of the insertion sleeve, which are associated with a corner point, are formed converging at an angle toward the corner point, the angle corresponding to an inner angle which the two sides of the polygonal outer contour converging at the corner point enclose.

7. The screw part according to claim 3, wherein the force engagement is formed with a regularly convex polygonal outer contour, at least one tooth being associated with one side of the polygonal outer contour, the respective tooth extending toward a point on the respective side which is located halfway along the respective side.

8. The screw part according to claim 7, wherein an end section of the tooth has an end face extending parallel to the respective side.

9. The screw part according to claim 1, wherein the insertion sleeve has a circumferentially closed ring profile in a view axial to the inner channel.

10. The screw part according to claim 1, wherein the insertion sleeve has openings circumferentially distributed in a circumferential wall.

11. The screw part according to claim 1, wherein the insertion sleeve is supporting structure with supports and beams and having openings defined as polygons enclosed by the supports and beams.

12. The screw part according to claim 1, wherein the insertion sleeve is formed from a bending element bent into a sleeve, with two outer edges of the bending element being bent together and engaged positively with corresponding contours for mutual connection.

13. The screw part according to claim 1, wherein the sheet metal part of the insertion sleeve is formed as a bending element bent into a sleeve with two bent-together outer edges of the bending element being connected to one another in a materially locking manner.

14. The screw part according to claim 1, wherein the insertion sleeve tapers in diameter in the manner of a cone pointing in the insertion direction (E).

15. The screw part according to claim 14, wherein the webs and/or teeth each have a transition section between a sleeve-shaped base of the insertion sleeve and their respective end section, the transition section extending obliquely to the base of the insertion sleeve and forming a first angle with the base of the insertion sleeve and a second angle with the end section, and the end section extending perpendicularly to the inner channel.

16. The screw part according to claim 1, wherein the insertion sleeve has formed at least at one axial end at least two webs distributed over a circumference of the insertion sleeve.

17. The screw part according to claim 16, wherein at least one of the at least two webs is formed facing the inner channel.

18. The screw part according to claim 17, wherein the at least two webs each project with an end section facing the inner channel from the polymeric mass in the support section or a non-functional section of the inner channel, the support section or the non-functional section of the inner channel being arranged axially adjacent to the sealing section and/or the retaining section and not serving to apply a circumferential seal or to lock the conduit system element.

19. The screw part according to claim 18, further comprising at least one axially extending groove formed in a circumferential section of the inner channel, within each groove one of the webs projects from a groove base, the web within the groove having at most a radial height corresponding to a depth of the groove.

20. The screw part according to claim 16, wherein at least one of the web points radially outwards from the inner channel.

21. The screw part according to claim 16, wherein at least one web points axially towards the inner channel.

22. The screw part according to claim 1, wherein the conduit system element can be inserted into the inner channel in the insertion direction (E) and can be locked in the inner channel, axially extending recesses being arranged in a circumferential section of the inner channel and extending at least partially over a sealing section and a section of the inner channel adjacent to the sealing section against the insertion direction (E).

23. The screw part according to claim 1, wherein the insertion sleeve is formed from VA steel or aluminum.

24. The screw part according to claim 1, wherein the plasticized polymeric mass has a fiber content by volume in the range from 2.5% to 75% and/or a fiber content by mass of 30% to 75%.

25. The screw part according to claim 1, wherein the fibers have a length in the range from 0.1 mm to 10 mm.

26. The screw part according to claim 25, wherein the fibers are formed as short fibers having a length in the range from 0.2 mm to 0.5 mm.

27. The screw part according to claim 25, wherein the fibers are formed as long fibers having a length in the range from 1 mm to 10 mm.

28. The screw part according to claim 25, wherein the fibers have an average diameter in the range from about 3 µm to 35 µm.

29. The process for manufacturing the screw part according to claim 1, the process comprising the step of injection molding the screw part utilizing only one injection point for injecting the polymeric mass.

30. The process according to claim 29, wherein the injection point is arranged at an angle to the inner channel of the screw part to be produced in such a way that the polymeric mass is injected at an angle to the inner channel into a closed molding tool and a core part of the molding tool that shapes the inner channel is actively cooled by means of a core cooling system.

31. The process according to claim 29, wherein a hot runner system is used for injection molding the screw part.

32. A screw part for engaging a conduit system element, the screw part having an annular cross-section, the screw part comprising a base element which is hollow cylindrical and at least partially injection-molded from a plasticized polymeric mass containing fibers, the base element having an axially extending mounting section and an axially extending threaded section, the base element further having a force engagement in the mounting section and an external thread on an outer wall in the threaded section, the base element having an inner channel for arranging and/or passing therethrough the conduit system element in an insertion direction (E), wherein the inner channel has at least one sealing section for arranging a circumferential seal for sealing between the inner channel and the conduit system element, and/or at least one support section for supporting and/or guiding the conduit system element, and/or at least one retaining section for directly or indirectly arresting the conduit system element, an insertion sleeve arranged in the base element at least partially in the mounting section and at least partially in the threaded section and coaxially with the inner channel, the insertion sleeve is at least partially encapsulated by the polymeric mass so that the insertion sleeve is at least partially surrounded by the polymeric mass radially facing towards the inner channel and radially away from the inner channel.

33. A screw part for engaging a conduit system element, the screw part having an annular cross-section, the screw part comprising a base element which is hollow cylindrical and at least partially injection-molded from a plasticized polymeric mass containing fibers, the base element having at least one external thread and an inner channel for arranging and/or passing therethrough the conduit system element in an insertion direction (E), wherein the inner channel has at least one sealing section for arranging a circumferential seal for sealing between the inner channel and the conduit system element, and/or at least one support section for supporting and/or guiding the conduit system element, and/or at least one retaining section for directly or indirectly arresting the conduit system element, an insertion sleeve arranged in the base element coaxially with the inner channel, the insertion sleeve is formed from an organo-sheet and is at least partially encapsulated by the polymeric mass so that the insertion sleeve is at least partially surrounded by the polymeric mass radially facing towards the inner channel and radially away from the inner channel.

* * * * *